(12) United States Patent
Bahl et al.

(10) Patent No.: US 8,126,999 B2
(45) Date of Patent: Feb. 28, 2012

(54) NETWORK DNA

(75) Inventors: Pradeep Bahl, Redmond, WA (US); Christopher J. Corbett, Duvall, WA (US); Mohamed Jawad Khaki, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1258 days.

(21) Appl. No.: 10/773,681

(22) Filed: Feb. 6, 2004

(65) Prior Publication Data
US 2005/0177631 A1    Aug. 11, 2005

(51) Int. Cl.
*G06F 15/173* (2006.01)
(52) U.S. Cl. .................................. 709/224; 709/225
(58) Field of Classification Search ........... 709/223–226
See application file for complete search history.

(56) References Cited

U.S. PATENT DOCUMENTS

| | | | |
|---|---|---|---|
| 5,774,669 A * | 6/1998 | George et al. ............... | 709/224 |
| 6,040,834 A * | 3/2000 | Jain et al. ................... | 715/853 |
| 6,141,690 A * | 10/2000 | Weiman ...................... | 709/228 |
| 6,298,044 B1 * | 10/2001 | Britt ............................ | 370/252 |
| 6,363,411 B1 * | 3/2002 | Dugan et al. ................ | 709/202 |
| 6,397,381 B1 * | 5/2002 | Delo et al. .................. | 717/174 |
| 6,434,613 B1 | 8/2002 | Bertram et al. | |
| 6,556,659 B1 * | 4/2003 | Bowman-Amuah ........ | 379/9.04 |
| 6,675,209 B1 * | 1/2004 | Britt ............................ | 709/224 |
| 6,708,137 B2 * | 3/2004 | Carley ........................ | 702/179 |
| 6,982,960 B2 * | 1/2006 | Lee et al. .................... | 370/254 |
| 7,120,680 B1 * | 10/2006 | Higgins et al. .............. | 709/220 |
| 7,159,125 B2 * | 1/2007 | Beadles et al. .............. | 713/193 |
| 7,209,964 B2 * | 4/2007 | Dugan et al. ................ | 709/223 |
| 7,257,560 B2 * | 8/2007 | Jacobs et al. ................ | 705/400 |
| 7,277,393 B1 * | 10/2007 | Jacobson et al. ............ | 370/238 |
| 7,448,070 B2 | 11/2008 | Barkley et al. | |
| 2001/0037384 A1 * | 11/2001 | Jemes et al. ................ | 709/223 |
| 2002/0091819 A1 * | 7/2002 | Melchione et al. ......... | 709/224 |
| 2002/0124094 A1 * | 9/2002 | Chang et al. ................ | 709/230 |

(Continued)

FOREIGN PATENT DOCUMENTS

JP   07-141265   6/1995

(Continued)

OTHER PUBLICATIONS

Zero Configuration Networking autumn 2002, Erikki Aula, Helsinki University of Technology, Espoo.*

(Continued)

*Primary Examiner* — Patrice Winder
*Assistant Examiner* — Tauqir Hussain
(74) *Attorney, Agent, or Firm* — Wolf, Greenfield & Sacks, P.C.

(57) ABSTRACT

Network DNA may be determined for a computer network that taxonomically classifies the computer network. Network DNA may include derived network DNA components and raw network DNA components. Raw network DNA components may be acquired from local or remote sources. Derived network DNA components may be generated according to derived network DNA component specifications. Derived network DNA component specifications may reference raw network DNA components. Network DNA determined for the computer network may include a network species component capable of indicating network species classifications for computer networks. Network species classifications may include enterprise network, home network and public place network. Network species classifications may be determined as a function of network security, network management and network addressing. One or more network DNA stores may be configured to store network DNA for computer networks. Network DNA stores may store network DNA history as well as current network DNA.

36 Claims, 11 Drawing Sheets

U.S. PATENT DOCUMENTS

| | | | |
|---|---|---|---|
| 2002/0176366 A1* | 11/2002 | Ayyagari et al. | 370/245 |
| 2002/0178246 A1* | 11/2002 | Mayer | 709/223 |
| 2003/0074359 A1* | 4/2003 | Tezuka | 707/10 |
| 2003/0074440 A1* | 4/2003 | Grabarnik et al. | 709/224 |
| 2003/0140142 A1* | 7/2003 | Marples et al. | 709/225 |
| 2003/0212684 A1* | 11/2003 | Meyer et al. | 707/10 |
| 2004/0006614 A1* | 1/2004 | DiFalco | 709/223 |
| 2004/0068582 A1* | 4/2004 | Anderson et al. | 709/245 |
| 2004/0095887 A1* | 5/2004 | Klincewicz et al. | 370/237 |
| 2005/0144314 A1* | 6/2005 | Kan et al. | 709/238 |
| 2005/0149948 A1* | 7/2005 | Gupta et al. | 719/321 |
| 2005/0257267 A1* | 11/2005 | Williams et al. | 726/25 |
| 2006/0084417 A1* | 4/2006 | Melpignano et al. | 455/418 |
| 2009/0086644 A1* | 4/2009 | Kompella et al. | 370/248 |

FOREIGN PATENT DOCUMENTS

| | | |
|---|---|---|
| JP | 07-210473 | 8/1995 |
| JP | 09-238138 | 9/1997 |
| JP | 2001-144758 | 5/2001 |
| JP | 2001-251301 | 9/2001 |
| JP | 2002-64561 | 2/2002 |
| JP | 2002-319970 | 10/2002 |
| JP | 2003-124931 | 4/2003 |
| JP | 2003-230167 | 8/2003 |
| JP | 2003-258872 | 9/2003 |
| WO | WO 0163447 A2 * | 8/2001 |
| WO | WO 02/084951 | 10/2002 |
| WO | WO 03/058884 | 7/2003 |
| WO | WO 2004/008693 | 1/2004 |

OTHER PUBLICATIONS

Using Windows XP with wireless networks, ORiNOCO Technical Bulletin 054/A, Sep. 2002.*

MSDN, "Network Location Awareness Service Provider (NLA)", *Windows Sockets 2 SDK*, 8 pgs, printed at http://msdn.microsoft.com/library/default.asp?url=/library/en-us/winsock/winsock/network_location_awareness_service_provider_nla_2.asp (Feb. 2003).

Valian, Peter and Todd K. Watson, "NetReg: An Automated DHCP Registration System", *Proceedings of LISA'99: 13th System Administration Conference and Exhibition*, pp. 139-147 (1999).

Kiesel, W., et al., "Communications Network for Manufacturing Applications (cnma) A European Initiative for Network Management in Industrial Communication," Conference Proceedings Article, dated Mar. 16, 1992, pp. 165-173.

Hong, W.K., et al, "The CORBA-based unified event management framework in multi-layer networks," *Computer Communications*, vol. 25, No. 3, dated Feb. 15, 2002, pp. 254-264.

Japanese Office Action from Japanese Application 2005-030904 dated Jun. 4, 2010.

Japanese Office Action for JP 2005-030904 dated Nov. 26, 2010.

* cited by examiner

NETWORK DNA

FIELD OF THE INVENTION

This invention pertains generally to computer networks and, more particularly, to computer network categorization.

BACKGROUND OF THE INVENTION

Computer networks and computer networking have become widespread. Underlying this spread is an increasing variety of computer network types, components and configurations. As a result, a computer system and/or computer system user attempting to maintain computer network connectivity may be subjected to requests for a bewildering array of network configuration parameters or be provided with numerous network characteristics and required to make connectivity decisions either without sufficient information or lack of understanding of the same. Perhaps worse, connectivity may be lost, not because of technical unavailability but, for example, through the use of the wrong network connectivity procedure. Attempts to resolve connectivity troubles may be hindered by a lack of readily available network status indicators and/or a common vocabulary for communicating with expert help.

Even where network connectivity itself is nominally maintained between computers, applications hosted by networked computers may need to adapt to network changes in order, for example, to avoid performance penalties or to prevent security vulnerabilities. As a result of the vast array of conventional network attributes, few applications are able to take each conventional network attribute into account. Networked application users may find themselves in the position of having overcome network connectivity difficulties only to be frustrated by a networked application that was the motivation for establishing connectivity in the first place, or to unknowingly expose themselves to a security risk.

While the above issues are particularly encountered by mobile computers and mobile computer users, it is common for multiple computer networks to be available to even immobile computers over their lifetime, if not concurrently. For example, many urban locations have at least one wired network connection as well as one or more wireless network options. Where multiple computer networks are available, the decision of which computer network to choose for a particular data packet may be a complex process in which conventional network attributes may not be able to provide the deciding factor.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, network DNA is determined for a computer network that taxonomically classifies the computer network. Network DNA may include derived network DNA components and raw network DNA components. Raw network DNA components may be acquired from local or remote sources. Each raw network DNA component may correspond to an attribute of the computer network. Derived network DNA components may be generated according to derived network DNA component specifications. Derived network DNA component specifications may reference raw network DNA components.

In an embodiment of the invention, network DNA determined for the computer network includes a network species component. In an embodiment of the invention, the network species component is capable of indicating network species classifications for computer networks. Network species classifications may include enterprise network, home network and public place network. Network species classifications may be determined as a function of network security, network management, network addressing, the network's intended use, and other attributes.

In an embodiment of the invention, one or more computers are connected to one or more computer networks. One or more network DNA stores may be configured to store network DNA for the computer networks. Network DNA stores may store network DNA history as well as current network DNA.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
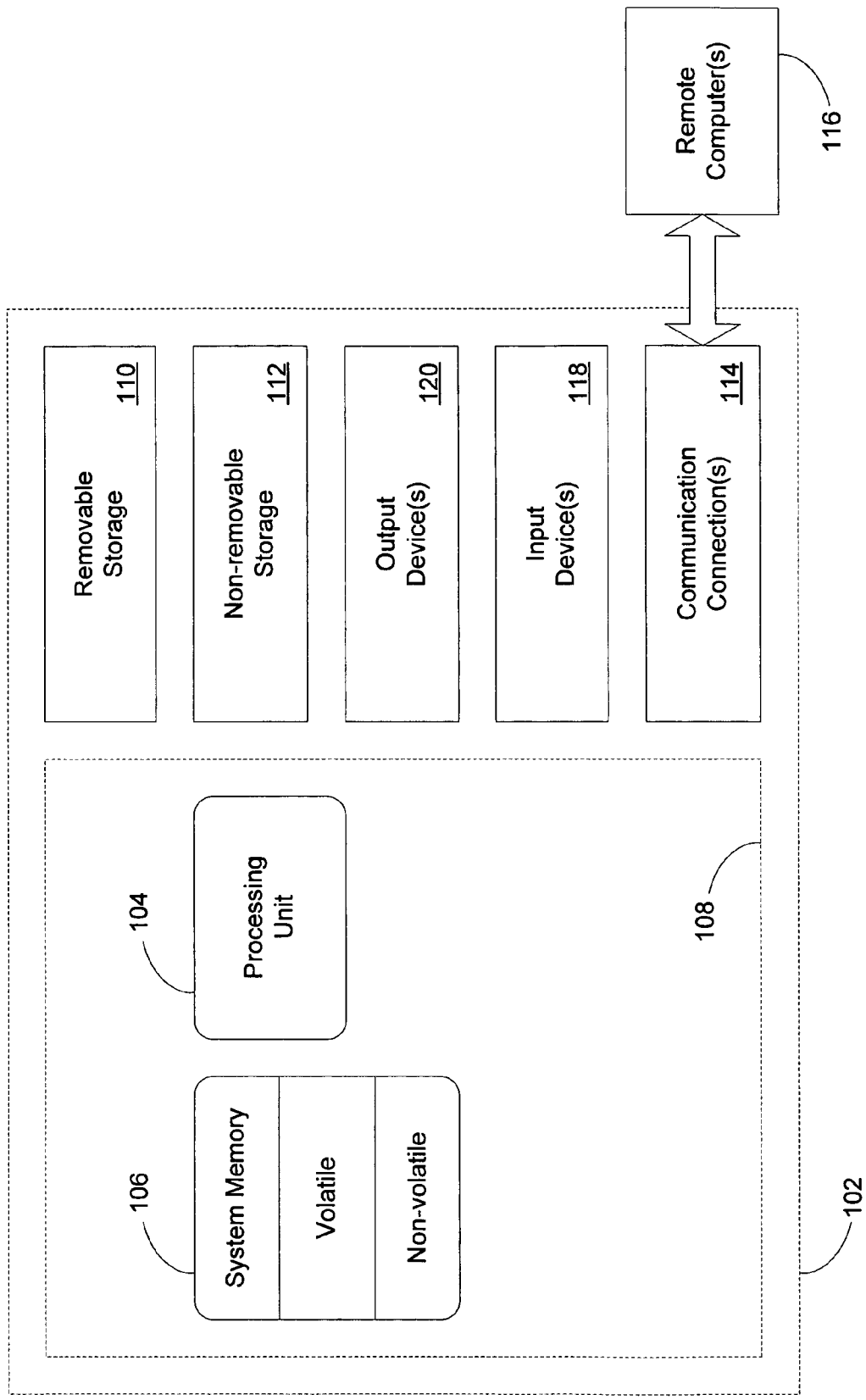
FIG. 1 is a schematic diagram generally illustrating an exemplary computer system usable to implement an embodiment of the invention.
Figure 2:
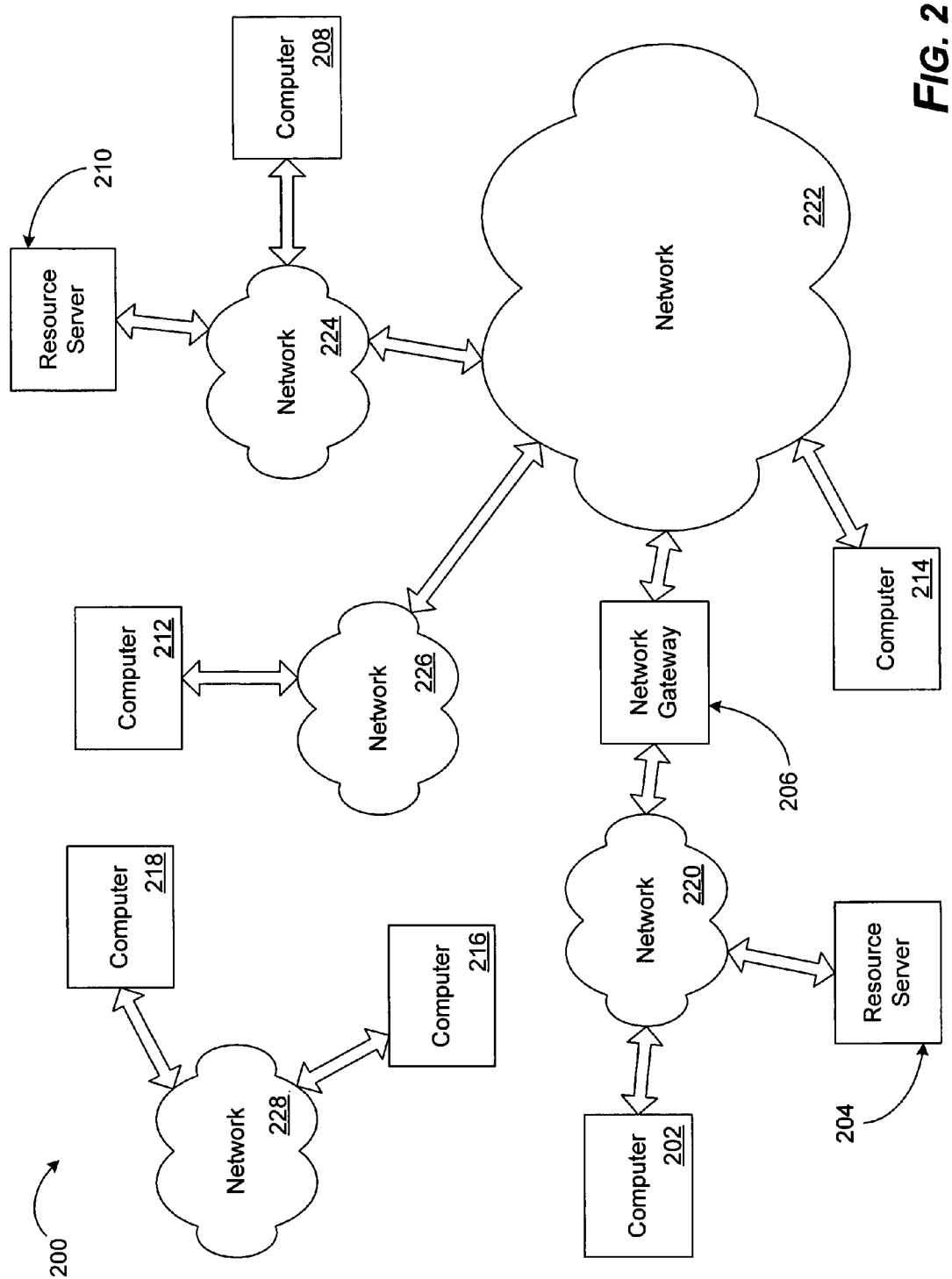
FIG. 2 is a schematic diagram illustrating computers variously connected by computer networks.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 2 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, radio frequency (RF), infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

A computer networking environment suitable for incorporating aspects of the invention may include multiple computer networks. Suitable computer networks may be differentiated by a variety of factors, for example, extent and coverage scope, implementation technology, node management, network security, network connectivity, node addressing schemes, service infrastructure elements, network mobility, network purpose and intended use, network topology and topological location as well as network operational characteristics. Examples of computer network coverage scope designations include personal area network (PAN), local area network (LAN), metropolitan area network (MAN) and wide area network (WAN). Coverage scope of computer networks may be related to computer network physical extent. Computer networks with different physical extents may employ different implementation technologies.

Broadly, implementation technologies may include wireless and wire-line. Suitable wireless technologies may include wireless communications protocols such as wireless communication protocols in compliance with the Institute of Electrical and Electronic Engineers (IEEE) 802.1x series of standards (e.g., Wi-Fi), and wireless communication protocols in compliance with the European Telecommunication Standards Institute (ETSI) Global System for Mobile communications (GSM) series of standards including a general packet radio service (GPRS), an enhanced data GSM environment (EDGE) and a universal mobile telecommunications system (UMTS). Wireless technologies may further include wireless communications protocols in compliance with a code division multiple access (CDMA) series of standards including CDMA 1X and CDMA2000, as well as the Bluetooth (BT) series of standards and the like. Wireless technologies may also include switched multi-megabit data services (SMDS), multi-channel multipoint distribution services (MMDS), local multipoint distribution services (LMDS), ultra-wideband (UWB) wireless, low power wireless sensor networks such as ZigBee™, as well as satellite-based wireless communication technologies.

Suitable wire-line technologies may include Ethernet (e.g., communications protocols in compliance with the IEEE 802.3x series of standards), Token ring (e.g., communications protocols in compliance with the IEEE 802.5x series of standards), as well as dial-up communication protocols such as Serial Line Internet Protocol (SLIP), Point-to-Point Protocol (PPP) and Remote Access Service (RAS). Wire-line technologies may further include integrated services digital network (ISDN), asynchronous transfer mode (ATM) protocols, cable modems in compliance with data communication standards such as a data over cable service interface specification (DOCSIS) as well as digital subscriber line (xDSL) and compatible technologies. Higher layer, e.g., International Standards Organization (ISO) Open System Interconnection (OSI) model layer, communication protocols such as Transmission Control Protocols (TCP) and Internet Protocols (IP) are further examples of suitable computer network implementation technologies.

Nodes (e.g., computers and infrastructure elements) of computer networks may be managed or unmanaged. In an embodiment of the invention, managed nodes do grant authority (e.g., authority to enforce network policy) to computer network administrators of computer networks to which they belong. In an embodiment of the invention, each node of a managed computer network is a managed node. Infrastructure elements of unmanaged computer networks may be managed nodes. In an embodiment of the invention, unmanaged nodes may form an unmanaged computer network (e.g., an ad hoc network) where there is no central administrator to enforce higher reliability and security standards for the network. Secure computer networks may include infrastructure elements such as firewalls, may require encrypted and authenticated communications (e.g., with nodes of other networks), and may engage in active intrusion detection.

Computer networks may have varying levels of network connectivity, for example, full, limited or none. Computer networks with limited network connectivity may limit access within the network as well as to other computer networks. Limited network connectivity may occur by design (e.g., policy and/or filtering), through misconfiguration or because of host/network component failure (e.g., host network adaptor or switch/router failure). Computer networks may incorporate different addressing schemes, for example, internal (private) addressing or external (public) addressing. Computer networks incorporating internal addressing may require infrastructure elements capable of network address translation (NAT) in order to provide connectivity to computer networks incorporating external addressing. Computer networks incorporating internal addressing may benefit from improved security and/or privacy.

Computer networks may incorporate service infrastructure elements or "fixed services" such as domain name services (DNS), proxy services, dynamic host configuration protocol (DHCP) services, network address translation services, firewall services and remote authentication dial-in user services (RADIUS). Some computer networks, for example, ad hoc, mesh or peer-to-peer computer networks, may not incorporate fixed services although they may incorporate distributed analogues, for example, multicast DNS, universal plug and play (UPnP), link local addresses and link local multicast name resolution (LLMNR).

Computer networks may have varying degrees of mobility. Mobile computer networks may have mobile network infrastructure elements such as mobile routers. For example, vehicle LANs may include wireless mobile routers with changing public subnet prefixes that provide network address translation for vehicle LAN nodes with unchanging private network addresses.

Computer networks may have an intended use or access policy. For example, computer networks may be intended for private use or intended for public use. In an embodiment of the invention, computer networks intended for private use have nodes that are owned by an organization that owns the network (or subscribes for its use). Computer networks intended for private use may be managed enabling high levels of trust between nodes. Computer networks intended for public use may provide relatively anonymous service to any customer with the ability to pay, or even free of charge. In an embodiment of the invention, client nodes (e.g., customer nodes) of computer networks intended for public use are unmanaged. Trust between nodes in computer networks intended for public use may be low and varying demand may make technical management difficult, for example, resulting in wide variation in quality of service.

Computer networks may have topological placement or location with respect to other computer networks. For example, computer networks may be transit (core) networks (e.g., internet service providers) that route data traffic to and from other networks, or stub networks that route data traffic within themselves as well as to and from transit networks. Operational attributes and characteristics of computer networks (i.e., network operational attributes) include speed or throughput (e.g., from kilobits per second to gigabits per second), congestion (e.g., low, medium, high or severe), load (e.g., low or underutilized, medium, average or typical, high or near capacity, and critical or at capacity), transmission latency, throughput jitter, packet loss probability, quality of service (QoS) and operational cost (e.g., per byte or per hour).

Computer networks may be premise networks, that is, private networks at particular locations. For example, one or more connected college campus LANs may be a premise network. Computer networks may be proximity networks, that is, networks established by nodes because of their proximity to one another, for example, over one or more shared wireless channels. Proximity networks may be single or multi-hop and may be of an ad hoc nature, established, for example, upon coming into a classroom or deployment area.

FIG. 2 illustrates an example computer networking environment incorporating multiple computer networks. The example computer networking environment 200 includes several computers 202, 204, 206, 208, 210, 212, 214, 216, 218 (e.g., each may be the computer 102 as described above with reference to FIG. 1) communicating with one another over several computer networks 220, 222, 224, 226, 228, each represented by a cloud. Each computer network 220, 222, 224, 226, 228 may include many well-known components, such as routers, gateways, hubs, and may allow the computers 202, 204, 206, 208, 210, 212, 214, 216, 218 to communicate via wired and/or wireless media. When interacting with one another over computer networks 220, 222, 224, 226, 228, one or more of the computers 202, 204, 206, 208, 210, 212, 214, 216, 218 may act as clients, servers or peers with respect to other computers 202, 204, 206, 208, 210, 212, 214, 216, 218. Accordingly, the various embodiments of the invention may be practiced on clients, servers, peers or combinations thereof, even though specific examples contained herein may not refer to all of these types of computers.

The computer 202 is connected to the computer network 220. A resource server 204 is also connected to the computer network 220. For example, the resource server 204 may be a file server, a directory server, a database server, a print server, a collaboration server, a DNS server, a provisioning server such as a DHCP server, an authentication server such as a RADIUS server, or combinations thereof. A Microsoft® Windows® XP server is an example of a resource server.

A network gateway 206 is connected to the computer network 220 and the computer network 222. The network gateway 206 may limit or filter the passage of computer network traffic between the computer network 220 and the computer network 222. For example, the network gateway 206 computer may execute firewall software that enforces a computer network traffic policy, for example a security policy, with regard to computer network traffic arriving at the network gateway 206.

For example, the computer network 220 may be an enterprise network running over an Ethernet LAN and employing an internal addressing scheme. The computers 202, 204 and 206 may each be managed nodes of the computer network 220. The computer network 222 may be a public inter-network such as the Internet. The cloud representing computer network 222 is larger than the clouds representing computer networks 220, 224, 226 and 228 to indicate that the computer network 222 is a transit network for data traffic to and from computer networks 220, 224 and 226. The computer 214 may have a dial-up connection to the computer network 222.

The computer network 224 may be a public wireless network connected to the computer network 222 by a digital telecommunications link (e.g., T1). The computer 208 may be an unmanaged node of the computer network 224 but, for example, the computer network 224 may require the computer 208 to register with the resource server 210 before providing the computer 208 with full connectivity to the network 222. The computer network 226 may be a home LAN able to support a virtual private network (VPN) between the computer 212 and the resource server 204 across the computer network 222, the network gateway 206 and the computer network 220. The computer network 228 may be a wireless computer network instantiated ad hoc by the computers 216 and 218. In this example computer networking environment, the computer network 228 is not connected to the other computer networks 220, 222, 224, 226. However, if, for example, the computer 216 established a connection with the computer network 220 then the computer 216 may be capable of acting as a bridge or network gateway for the computer network 228.

Figure 3:
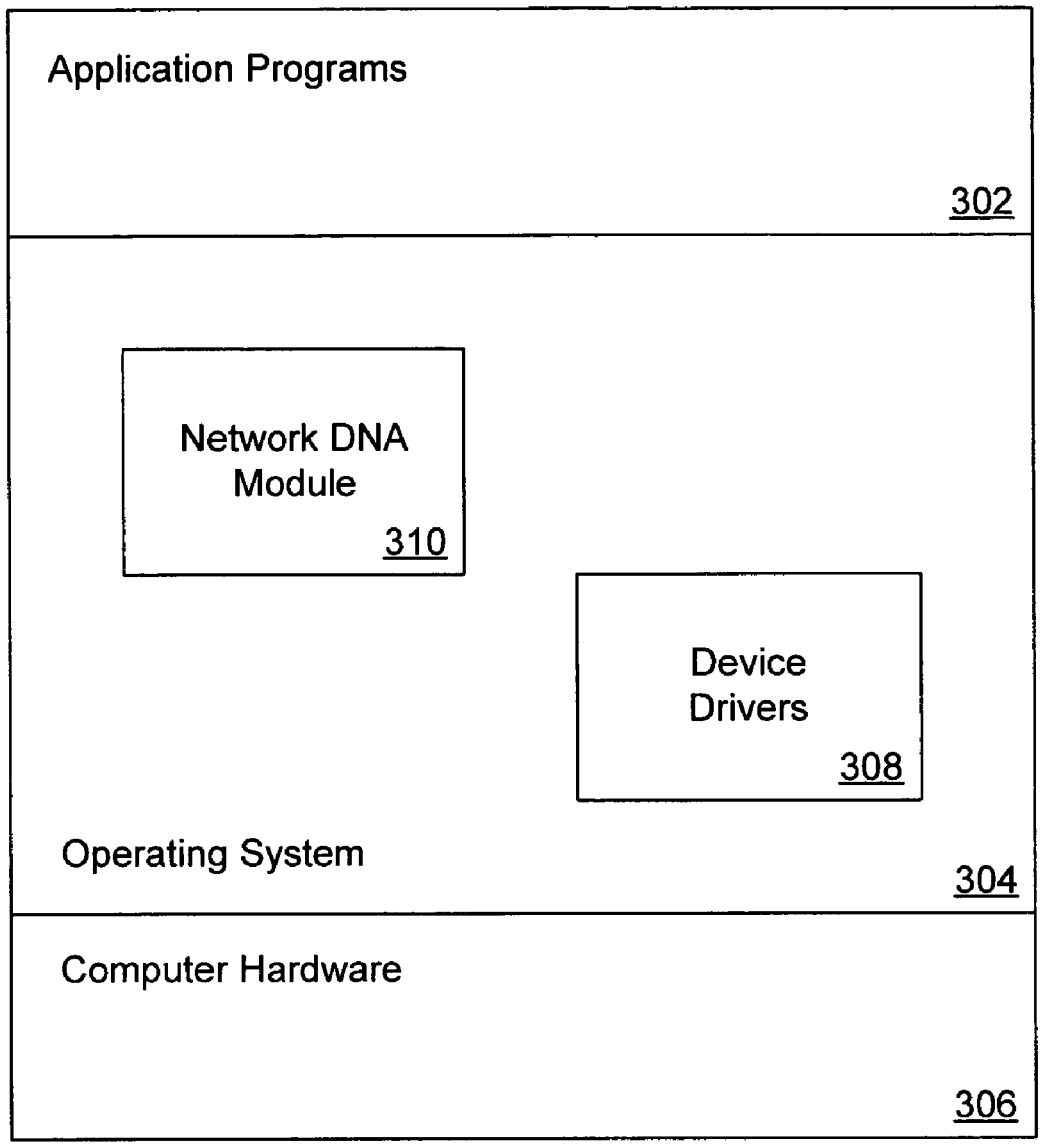
FIG. 3 is a schematic diagram illustrating an example high level systems architecture in accordance with an embodiment of the invention.

FIG. 3 depicts an example high level systems architecture in accordance with an embodiment of the invention. Application programs 302 may utilize an operating system 304 to interact with computer hardware 306. For example, the computer hardware 306 may include any hardware components of the computer 102 described above with reference to FIG. 1. The operating system 304 may include device drivers 308 and a network DNA module 310. Each component of the computer hardware 306 may be associated with one or more of the device drivers 308. Each of the device drivers 308 may provide one or more software interfaces for interacting with the computer hardware 306.

The network DNA module 310 may dynamically gather network attributes from the computer hardware 306, the operating system 304 and the application programs 302. In an embodiment of the invention, the network DNA module 310 resides on one or more computers. Each computer may be connected to one or more computer networks. The network DNA module 310 may determine network DNA for each connected computer network. Network DNA may taxonomically classify the associated computer network. The network DNA for a particular computer network may change over time but, in an embodiment of the invention, such changes are infrequent. Computer network connections (e.g., communication connections 114 of FIG. 1) need not be active in order for the network DNA module 310 to determine network DNA for associated computer networks. The network DNA module 310 may provide network DNA, for example, upon request, or by publishing network DNA events to interested subscribers.

The network DNA module 310 may be incorporated into or may utilize (e.g., dynamically gather network attributes with) a network application programming interface, for example, the Windows Sockets 2 (Winsock) network application programming interface (API), as detailed in the Windows Sockets 2 section of the February 2003 Microsoft® Windows® Platform Software Development Kit (SDK) documentation in the Microsoft Developer Network (MSDN®) Library. The network DNA module 310 may be incorporated into or may utilize (e.g., dynamically gather network attributes from) a network location awareness module, for example, the network location awareness module detailed by the Network Location Awareness Service Provider section of the February 2003 Microsoft® Windows® Platform SDK documentation in the MSDN® Library. Although not shown in FIG. 3, the network application programming interface and/or the network location awareness module may be incorporated into the operating system 304.

Figure 4:
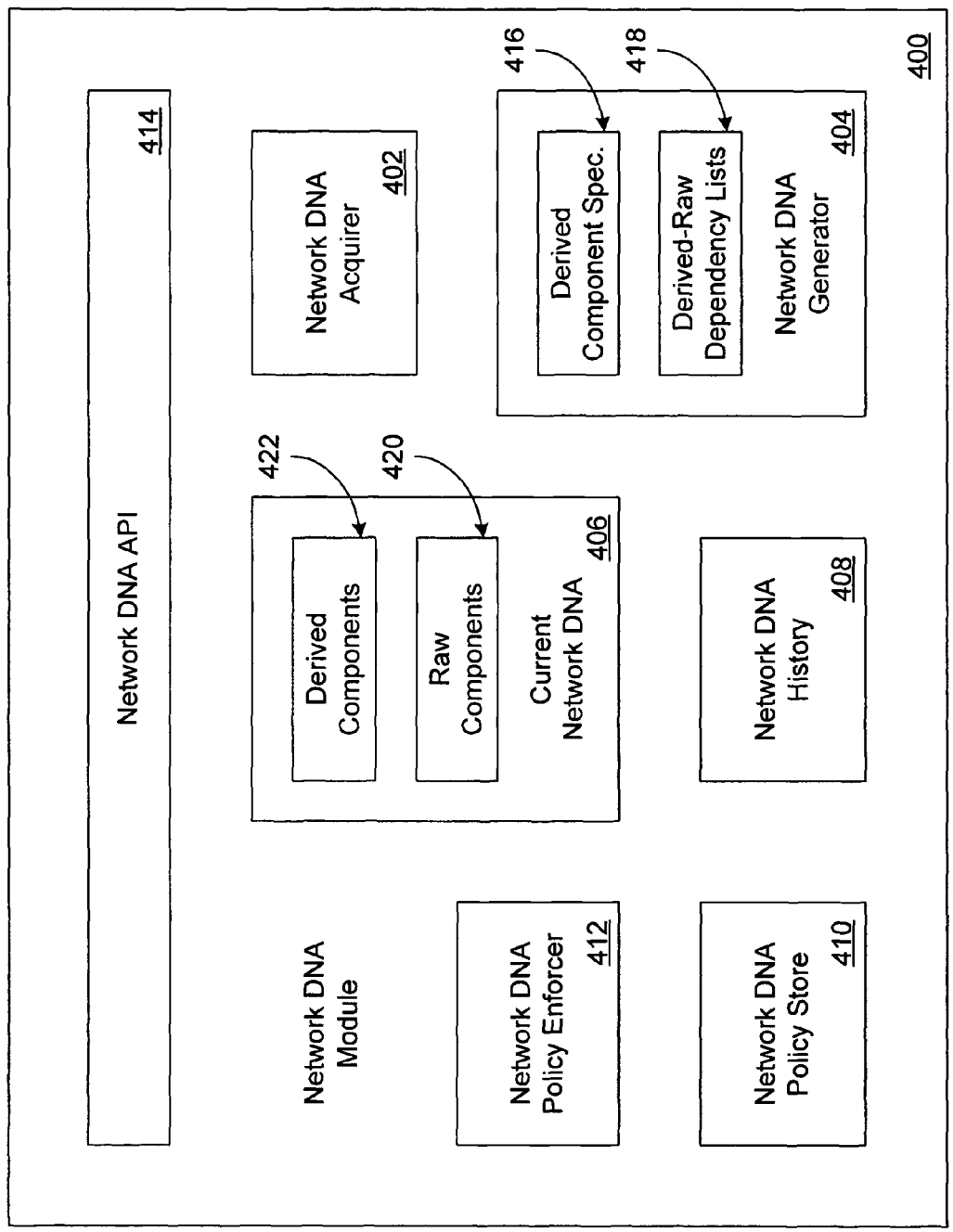
FIG. 4 is a schematic diagram illustrating an example network DNA module architecture in accordance with an embodiment of the invention.

FIG. 4 depicts an example network DNA module architecture in accordance with an embodiment of the invention. The example network DNA module 400 includes a network DNA acquirer 402, a network DNA generator 404, a current network DNA 406 store, a network DNA history 408 store, a network DNA policy store 410, a network DNA policy enforcer 412 and a network DNA application programming interface (API) 414. The network DNA generator 404 may include derived network DNA component specifications 416 and derived-raw network DNA component dependency lists 418. The current network DNA 406 store may include raw network DNA components 420 and derived network DNA components 422. The current network DNA 406 store, the network DNA history 408 store, the network DNA policy store 410 and/or other network DNA module 400 stores may be implemented with conventional database technologies, caching technologies and/or the like.

The network DNA acquirer 402 may acquire raw network DNA component values from the computer hardware 306 (FIG. 3), the operating system 304, the application programs 302 and from network DNA modules located on remote computers 116 (FIG. 1). The network DNA acquirer 402 may acquire raw network DNA component values from both trusted (e.g., authenticated) and untrusted sources. Some computer networks may incorporate network DNA provisioning servers to provide an explicit and efficient source of network DNA. Conventional provisioning schemas may be enhanced with network DNA.

Raw network DNA component values may be simple copies of static values, samples of dynamically changing values or the like. Examples of raw network DNA components include IP addresses, domain names, verified presence of network infrastructure elements (e.g., DNS servers, authentication servers, proxy servers, NAT), successful authentication, parameters received from DHCP servers (e.g., subnet mask), communications media type (e.g., wireless or wireline), network traffic analysis (e.g., source address set or statistical traffic 'fingerprint' match), cost, service provider, roaming agreements, nominal available communications bandwidth, measured available communications bandwidth, logical and physical network location. Raw network DNA components may be any suitable (e.g., acquirable) conventional computer network attribute. Raw network DNA components may be input by a computer user utilizing a suitable user interface mechanism.

The network DNA acquirer 402 may update the raw network DNA components 420 area of the current network DNA 406 store. The network DNA acquirer 402 may copy current network DNA component values to the network DNA history 408 store before updating them. The network DNA acquirer 402 may notify the network DNA generator 404 of updates to the current network DNA 406 store.

The network DNA generator 404 may determine derived network DNA component values from raw network DNA component value. The network DNA generator 404 may determine derived network DNA component values according to the derived network DNA component specifications 416. For example, each of the derived network DNA component specifications 416 may specify a linear or non-linear combination and/or transformation of one or more raw network DNA component values. The derived-raw network DNA component dependency lists 418 may include, for each derived network DNA component, a list of raw network DNA components required to determine the derived network DNA component, and/or, for each raw network DNA component, a list of derived network DNA components that depend upon the raw network DNA component (e.g., the raw network DNA component is part of the derived network DNA component specifications for the derived network DNA components). The network DNA generator 404 may update the derived network DNA components 422 area of the current network DNA 406 store. The network DNA generator 404 may copy current network DNA component values to the network DNA history 408 store before updating them.

The network DNA policy enforcer 412 may enforce network DNA policies stored in the network DNA policy store 410. The network DNA policies may depend upon network DNA stored in the current network DNA 406 and/or network DNA history 408 stores, for example, network DNA policy actions may be triggered by network DNA components taking on particular values or crossing particular thresholds. The network DNA application programming interface 414 may enable, for example, application programs 302 (FIG. 3) to edit network DNA policies as well as get current network DNA and network DNA history.

Before describing procedures performed by the network DNA module in more detail, it will be helpful to describe further details of network DNA, network DNA policies and the network DNA application programming interface 414 (FIG. 4).

Figure 5:
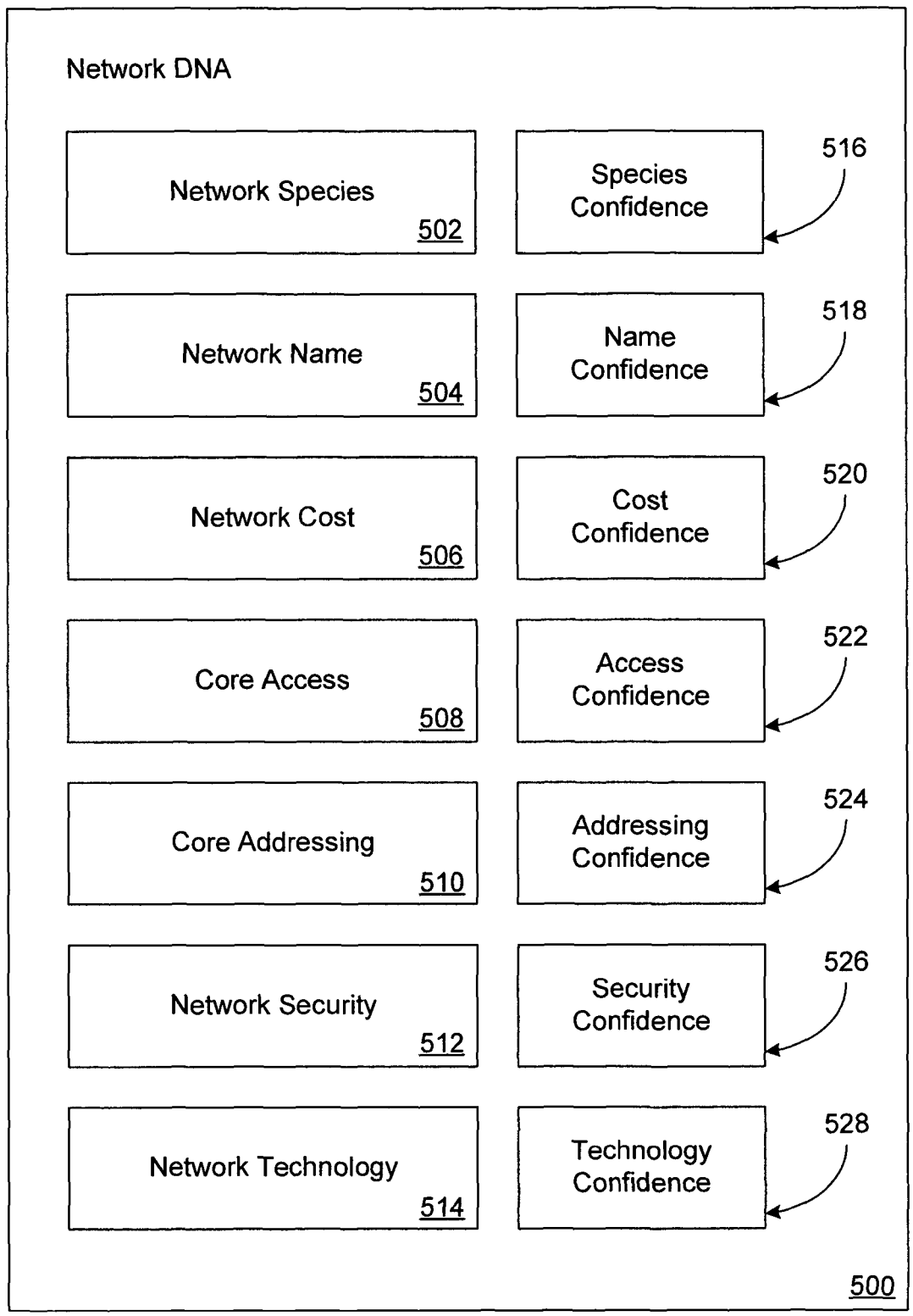
FIG. 5 is a block diagram depicting example network DNA in accordance with an embodiment of the invention.

FIG. 5 depicts example network DNA in accordance with an embodiment of the invention. The example network DNA 500 includes a network species 502 component, a network name 504 component, a network cost 506 component, a core access 508 component, a core addressing 510 component, a network security 512 component and a network technology 514 component. Each network DNA component may be associated with one or more subcomponents, for example, one or more raw network DNA components (e.g., raw network DNA components 420 of FIG. 4) and/or one or more derived network DNA components (e.g., derived network DNA components 422 of FIG. 4). Each network DNA component may be associated with a confidence level, for example, from 0% to 100% or a scale of 0 to 5.

In this example, the network species 502 component is associated with a network species confidence 516, the network name 504 component is associated with a network name confidence 518, the network cost 506 component is associated with a network cost confidence 520, the core access 508 component is associated with a core access confidence 522, the core addressing 510 component is associated with a core addressing confidence 524, the network security 512 component is associated with a network security confidence 526, and the network technology 514 component is associated with a network technology confidence 528. Each network DNA confidence 516, 518, 520, 522, 524, 526, 528 may indicate a level of confidence (e.g., a statistical confidence) in the accuracy and/or precision of the associated network DNA component value(s). Network DNA confidence levels may be updated by the network DNA generator 404 (FIG. 4) when derived network DNA components 422 are updated.

The network species 502 component of the network DNA 500 may indicate a network class (or species) for the associated computer network. For example, the network species 502 component may indicate that the associated computer network is an enterprise network, a home network or a public place (public) network. The network species 502 component of the network DNA 500 may be one of the derived network DNA components 422 (FIG. 4) and may be associated with one or more of the derived network DNA component specifications 416.

For example, one of the derived network DNA component specifications 416 (FIG. 4) associated with the network species 502 component may specify that the network species 502 component is to indicate that the associated computer network is an enterprise network if the attributes of the associated computer network include a specified combination of: is a secure network (i.e., has good network security), is a managed network (i.e., has good network management), provides connectivity to one or more specified enterprise resources (e.g., has good local area network connectivity), includes wireless LAN technology, is a mobile network (i.e., has good network mobility), is a private network (e.g., utilizes internal network addressing), is a premise network and is not a proximity network. Examples of computer networks that may have one or more combinations of such computer network attributes include corporate computer networks (e.g., for employees only), virtual private networks, fleet networks (e.g., fleet of corporate-owned vehicles), managed community networks, and warehouse networks.

The derived network DNA component specification may specify that the network species 502 component is to indicate that the associated computer network is a home network if the attributes of the associated computer network include a specified combination of: is an insecure network (i.e., has poor network security), is an unmanaged network (i.e., has poor network management), provides ad hoc and/or limited connectivity between network nodes and other computer networks (e.g., the internet), includes PAN, LAN and/or wireless LAN technology, is not a mobile network (i.e., has poor network mobility), is a private network (e.g., utilizes internal network addressing), is a premise network or a proximity network. Examples of computer networks that may have one or more combinations of such computer network attributes include home networks and residential networks.

The derived network DNA component specification may specify that the network species 502 component is to indicate that the associated computer network is a public place network if the attributes of the associated computer network include a specified combination of: is an insecure network, is an unmanaged network, includes PAN, LAN, wireless LAN and/or wireless WAN technology, provides connectivity to other computer networks (e.g., the internet), is not a mobile network, has an associated access cost, is not a private network, is not a premise network and is not a proximity network. Examples of computer networks that may have one or more combinations of such computer network attributes include computer networks at airports, restaurants and coffee houses, convention centers, hotels (particularly hotel lobbies), public libraries, corporate guest networks and some wireless wide area networks.

As shown in the above examples, derived network DNA component specifications 416 (FIG. 4) need not be mutually exclusive. Each derived network DNA component specification may include a network DNA confidence scoring specification. For example, a particular derived network DNA component specification may reference multiple raw network DNA components. The associated network DNA confidence scoring specification may specify that missing (e.g., not yet acquired) or unverified (e.g., acquired from untrusted sources) raw network DNA components result in a lower confidence and that some raw network DNA components have greater influence on confidence level than others. Where a total number of different derived network DNA component values is reasonable (e.g., 100, but depending upon computer processing power), each different value may have an associated confidence score. In such a case, requests for the value of a particular derived network DNA component may result in responses including one or more values with highest associated confidence scores.

The network name 504 component of the network DNA 500 may indicate a network name and/or network identifier for the associated computer network. The network name may, for example, be a simple alphanumeric character string or a more complex data structure. The network name may include, for example, a globally unique identifier (GUID) that uniquely identifies the associated computer network. However, neither the network name 504 component nor network DNA 500 as a whole, need be unique across computer networks. As for each derived network DNA component 502, 504, 506, 508, 510, 512 and 514, network name 504 component attributes and values may be specified by one or more of the derived network DNA component specifications 416 (FIG. 4). Where probabilistic network name resolution is utilized, the network name confidence 518 may indicate, for example, a confidence level of the determination so far due to progress of the probabilistic name resolution process.

The network cost 506 component of the network DNA 500 may indicate historical, future and current costs associated with utilizing the associated computer network. For example, the network cost 506 component may reference one or more computer network usage rate plans including per byte, per hour and other suitable bandwidth, time period and/or network resource pricing options. Cost determination may be probabilistic, for example, approximation techniques may be utilized where cost determination is complex, in which case the network cost confidence 520 may indicate a margin of error.

The core access 508 component of the network DNA 500 may indicate to what degree the associated computer network provides access to core or transit networks (e.g., the internet). For example, the core access 508 component may indicate that authentication with a particular resource server is required for core network access. Core network access determination may be probabilistic and/or progressive, particularly from computers connected to unmanaged networks. The core access confidence 522 may indicate the progress and/or degree of achievement of the determination procedure.

The core addressing 510 component of the network DNA 500 may indicate whether the associated computer network utilizes internal (private) or external (public or core) addressing. Internal addressing may reduce a set of suitable communications protocols available to applications. Core addressing determination may be probabilistic and/or progressive, or the core addressing confidence 526 may simply indicate a confirmed or unconfirmed status.

The network security 512 component of the network DNA 500 may indicate one or more security mechanisms available in the associated computer network, as well as, for example, which security mechanisms are mandatory for computers connected to the associated computer network. For example, the network security 512 component may indicate that authentication with one or more network infrastructure elements or resource servers is mandatory and that encryption is available but optional. The network security 512 component may also reference suitable authentication credentials and/or encryption keys. Determination of available and/or mandatory security mechanisms may be probabilistic and/or progressive, for example, additional encryption options may become available following authentication. The network security confidence 526 may indicate determination progress and/or confidence in the integrity of active security mechanisms in the associated computer network.

The network technology 514 component of the network DNA 500 may indicate one or more network implementation technologies utilized by the associated computer network. The network technology indication may include coarse grained classifications, for example, wireless or wire-line, as well as fine grained classifications, for example, IEEE 802.11a, IEEE 802.11b or IEEE 802.16a wireless. Determination of network technology classifications may be probabilistic and/or progressive. The network technology confidence 528 may include a confidence level for each determined network technology classification.

Figure 6:
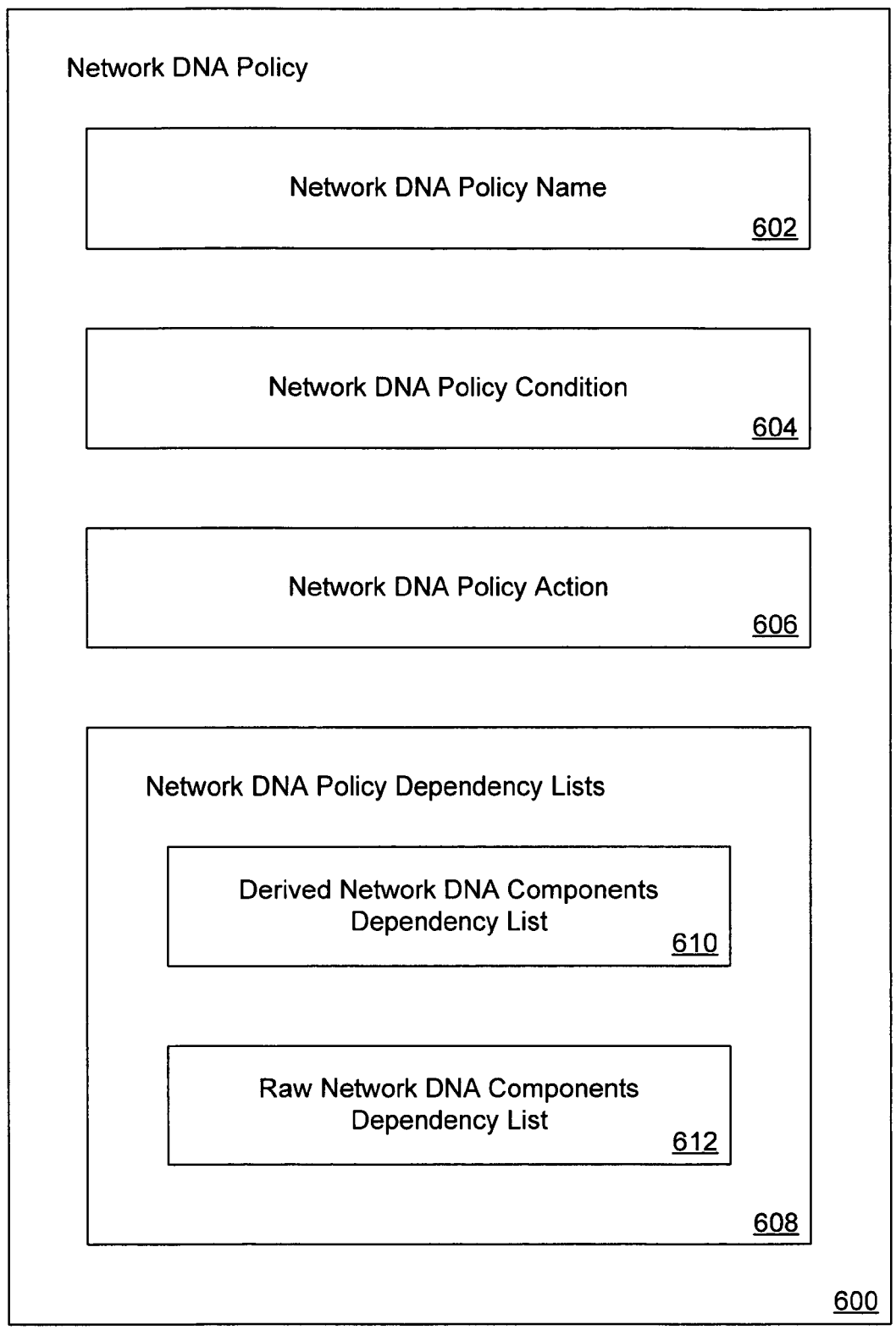
FIG. 6 is a block diagram depicting an example network DNA policy in accordance with an embodiment of the invention.

Network DNA policies may depend upon network DNA 500. FIG. 6 depicts an example network DNA policy in accordance with an embodiment of the invention. The example network DNA policy 600 includes a network DNA policy name 602, a network DNA policy condition 604, a network DNA policy action 606 and network DNA policy dependency lists 608. The network DNA policy dependency lists 608 include a derived network DNA components dependency list 610 and a raw network DNA components dependency list 612.

The network DNA policy name 602 may be a unique name (e.g., alphanumeric character string or a globally unique identifier) of the network DNA policy 600. The network DNA policy name 602 may serve as an identifier and/or reference for the network DNA policy 600. A condition specified by the network DNA policy condition 604 may reference derived network DNA components and/or raw network DNA components of current network DNA 406 (FIG. 4) and/or network DNA history 408. An action specified by the network DNA policy action 606 may be initiated by the network DNA module 400 if the condition specified by the network DNA policy condition 604 is satisfied.

The network DNA policy dependency lists 608 may list system aspects (e.g., components, modules, resource servers) that the network DNA policy 600 depends upon in order to determine if the network DNA policy condition 604 is satisfied and/or to initiate the network DNA policy action 606. The derived network DNA components dependency list 610 may list derived network DNA components referenced by the network DNA policy condition 604. The raw network DNA components dependency list 612 may list raw network DNA components referenced by the network DNA policy condition 604.

Examples of network DNA policies include polices for adapting to network changes and for selecting between multiple available networks. Network DNA policies may adapt system behavior in response to network DNA 500, for example, changes in the network technology 514 component of the network DNA 500 (e.g., when switching computer networks) may trigger reconfiguration of application programs 302 (FIG. 3) and/or the operating system 304 to avoid performance penalties. For example, a messaging application may download a specified portion of a message (e.g., as opposed to the whole message) or synchronize with a messaging server less aggressively (e.g., less often) for certain network technology 514 classifications and/or subcomponent values.

Changes in the network security 512 component of the network DNA 500 (e.g., when switching computer networks) may likewise trigger reconfiguration of application programs 302 and/or the operating system 304 to reduce the likelihood of security vulnerabilities. One or more network DNA policies may determine a choice between multiple available networks, for example, based on a combination of the network cost 506 and core access 508 components of the network DNA 500. Additional examples of network DNA components that may be utilized in deciding between multiple available networks (or any suitable network DNA policy decision) include: network security 512, speed, load, latency, congestion, radio frequency interference (e.g., noise) and network operator (not necessarily of the first hop, for example, the operator/owner of a GPRS network supplying connectivity to a Wi-Fi 'hotspot'). While network DNA policies may reduce the probability of user intervention, choice between multiple computer networks need not be fully automated. Computer users may be presented with a filtered list of possible choices.

Network DNA policies may specify that system security settings be reconfigured depending on the network species 502 component of the network DNA 500. A computer with a particular network DNA policy that is connected to a home or public network (as indicated by the network species 502) may automatically attempt to establish a VPN connection to a specified enterprise network so that, for example, the computer has access to enterprise network resource and/or to become managed. Another network DNA policy may specify that bridging (or inter-network routing) be disabled if a computer with the policy is, for example, connected to both an enterprise network and a home or public network as indicated by the network species 502.

The network DNA application programming interface 414 (FIG. 4) may provide application programs 302 (FIG. 3) and operating system 304 access to network DNA and network DNA policies. In an embodiment of the invention, a human-oriented characteristic of network DNA makes network DNA particularly suited for network mapping (e.g., on graphical user interfaces) and network support applications (e.g., enterprise help desk, troubleshooting/diagnostics, and security breach post-mortem). Network DNA may enhance computer user (and application developer) understanding of connected computer networks which may enhance computer user experience and efficiency. In an embodiment of the invention, network DNA may be logged and communicated between computer network nodes to enhance both automatically and manually managed aspects of computer network efficiency, for example, reducing the likelihood of over/under allocation of upstream bandwidth by streaming data sources.

Figure 7:
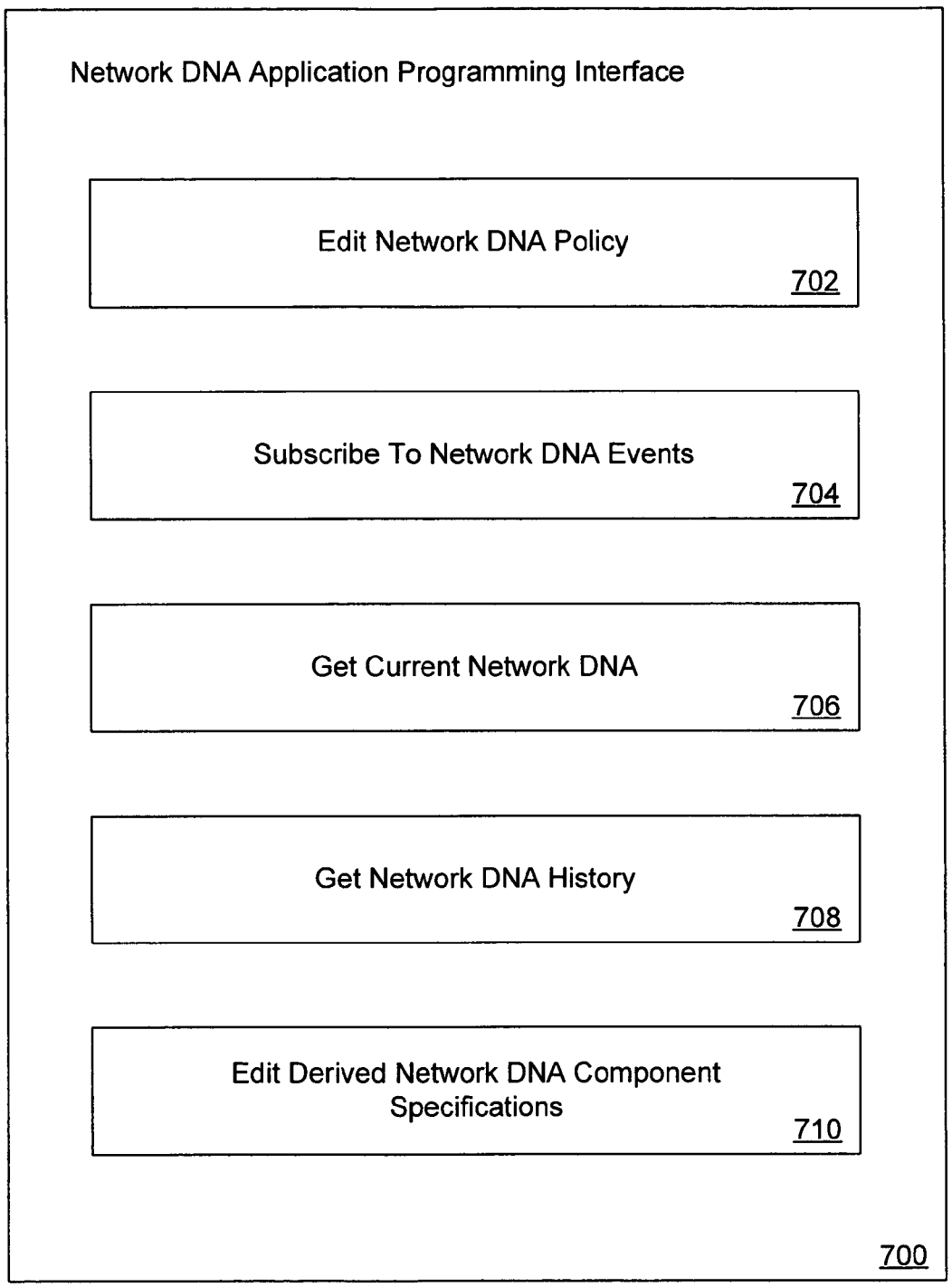
FIG. 7 is a schematic diagram illustrating an example network DNA application programming interface in accordance with an embodiment of the invention.

FIG. 7 depicts an example network DNA application programming interface in accordance with an embodiment of the invention. The example network DNA application programming interface 700 includes an edit network DNA policy 702 element, a subscribe to network DNA events 704 element, a get current network DNA 706 element, a get network DNA history 708 element and an edit derived network DNA component specifications 710 element. Each application programming interface element 702, 704, 706, 708 and 710 may include one or more interface specifications that specify the manner in which computer system modules and components may interact with the network DNA module 400. As will be apparent to one of skill in the art, the interface specifications may include function call specifications, program object specifications, message specifications such as request/response message pairs, and/or any other suitable programming interface specification.

The edit network DNA policy application programming interface element 702 may enable computer system modules and components to create, read, update, delete and temporarily disable or enable network DNA policies of the network DNA module 400 (FIG. 4), for example, network DNA policies stored in the network DNA policy store 410. Interface specification parameters may include one or more network DNA policies (e.g., as described above with reference to FIG. 6), network DNA policy actions, network DNA policy conditions, network DNA policy names, a date and time for a particular policy (or policy set) to take effect, a date and time range for the policy to remain in effect and/or a date and time range for the policy to remain disabled, and an event that triggers enabling or disabling of a particular policy. For example, network DNA policy conditions may be specified with a structured query language, an object oriented language (e.g., an object query language), a scripting language (e.g., Microsoft® VBSCRIPT), or any suitable condition specification language, and network DNA policy actions may be specified with a database stored procedure language, an object oriented language, a scripting language, or any suitable action specification language.

The subscribe to network DNA events application programming interface element 704 may enable computer system modules and components to subscribe to and unsubscribe from events published by the network DNA module 400 (FIG. 4). Interface specification parameters may include one or more network DNA event specifications (e.g., event identifiers, event range specifications) and one or more subscription addresses (e.g., reference to a network DNA event delivery mechanism). Examples of network DNA events published by the network DNA module 400 include current network DNA 406 changes, network DNA policy changes, occurrence of network DNA policy enforcement actions, and any suitable network DNA module 400 change event.

The get current network DNA application programming interface element 706 may enable computer system modules and components to retrieve a copy of the current network DNA 406 (FIG. 4). Interface specification parameters may include a set of network DNA components to retrieve and parallel programming (multithreaded) behavior specifiers such as wait and timeout flags. The get current network DNA history application programming interface element 708 may enable computer system modules and components to retrieve a copy of network DNA history 408. Interface specification parameters may include a set of network DNA components to retrieve, a range (e.g., a data and time range) of network DNA history entries to retrieve and parallel programming (multithreaded) behavior specifiers such as wait and timeout flags.

The edit derived network DNA component specifications application program interface element 710 may enable computer system modules and components to create, read, update and delete derived network DNA component specifications 416 (FIG. 4). Interface specification parameters may include one or more derived network DNA component specifications (e.g., as described above with reference to FIG. 4). For example, derived network DNA component specifications may be specified with a structured query language, an object oriented language, a scripting language, a database stored procedure language or any suitable component specification language.

Having described structural aspects of the network DNA module 400 (FIG. 4) above, behavioral aspects of the network DNA module 400 are now described in more detail.

The network DNA acquirer 402 (FIG. 4) may dynamically acquire raw network DNA components. The number of potential raw network DNA components to be acquired (acquisition targets) may be large. The network DNA acquirer 402 may prioritize acquisition targets according to network DNA policy needs. For example, network DNA policies in the network DNA policy store 410 may be ordered and the network DNA acquirer 402 may acquire network DNA components referenced by network DNA policies in accord with that order. Some raw network DNA components may require periodic re-acquisition (e.g., every 5 seconds) and may be given priority to prevent them becoming 'stale' in the current network DNA 406 store. Some raw network DNA components may require asynchronous acquisition triggered by an event. Acquisition of some raw network DNA components may need to take place after others, for example, following successful authentication with a network authentication server, and thus may be prioritized accordingly.

Figure 8A:
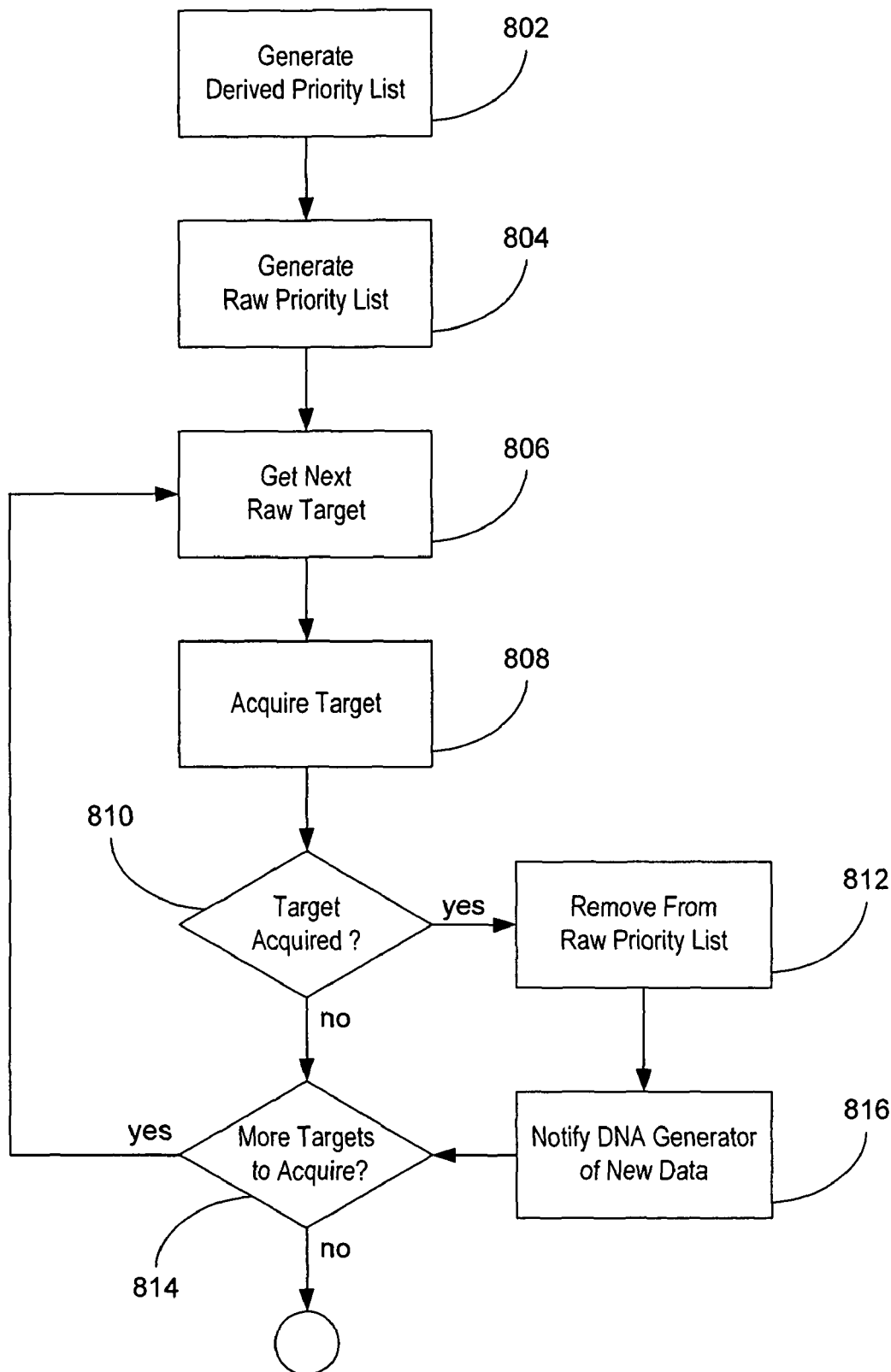
FIG. 8A is a flowchart depicting example steps for acquiring network DNA in accordance with an embodiment of the invention.

FIG. 8A depicts example steps that may be performed to acquire network DNA in accordance with an embodiment of the invention. At step 802, a derived network DNA acquisition priority list is generated. For example, the network DNA acquirer 402 (FIG. 4) may query the network DNA policy store 410 for the derived network DNA components dependency list 610 (FIG. 6) of each active network DNA policy. If the network DNA policies are ordered then the derived network DNA components may be added to the derived network DNA acquisition priority list in accord with that order.

At step 804, a raw network DNA acquisition priority list is generated. For example, the network DNA acquirer 402 (FIG. 4) may query the network DNA policy store 410 for the raw network DNA components dependency list 612 (FIG. 6) of each active network DNA policy. In addition, the network DNA acquirer 402 may determine any raw network DNA components required by each member of the derived network DNA acquisition priority list. For example, the network DNA acquirer 402 may query the network DNA generator 404 for the associated derived-raw network DNA component dependency lists 418. If the network DNA policies are ordered then the raw network DNA components may be added to the raw network DNA acquisition priority list in accord with that order. Each raw network DNA component may have an associated acquisition difficulty, for example, related to acquisition time or required refresh rate. Acquisition order may be modified so that the most easily acquired raw network DNA components tend to be acquired before components that are more difficult to acquire. In an embodiment of the invention, step 802 is performed as an integral part of step 804.

At step 806, a next acquisition target may be selected from the raw network DNA acquisition priority list. At step 808, an attempt is made to acquire the selected acquisition target as described above with reference to FIG. 4. There may be a limited time period allocated for the acquisition of each target. At step 810, a determination is made as to whether the selected acquisition target was successfully acquired. If the target was successfully acquired then the procedure progresses to step 812, otherwise the procedure progresses to step 814.

At step 812, the acquired raw network DNA component may be stored in the raw network DNA components 420 (FIG. 4) area of the current network DNA 406 and the associated reference removed from the raw network DNA acquisition priority list. At step 816, the network DNA generator 404 may be notified of the successful acquisition. For example, the network DNA acquirer may publish a raw network DNA acquisition event. At step 814, a length of the raw network DNA acquisition priority list may be checked. If the list is empty then there are no current acquisition targets and the procedure exits, otherwise, the procedure returns to step 806 to select the next acquisition target.

Figure 8B:
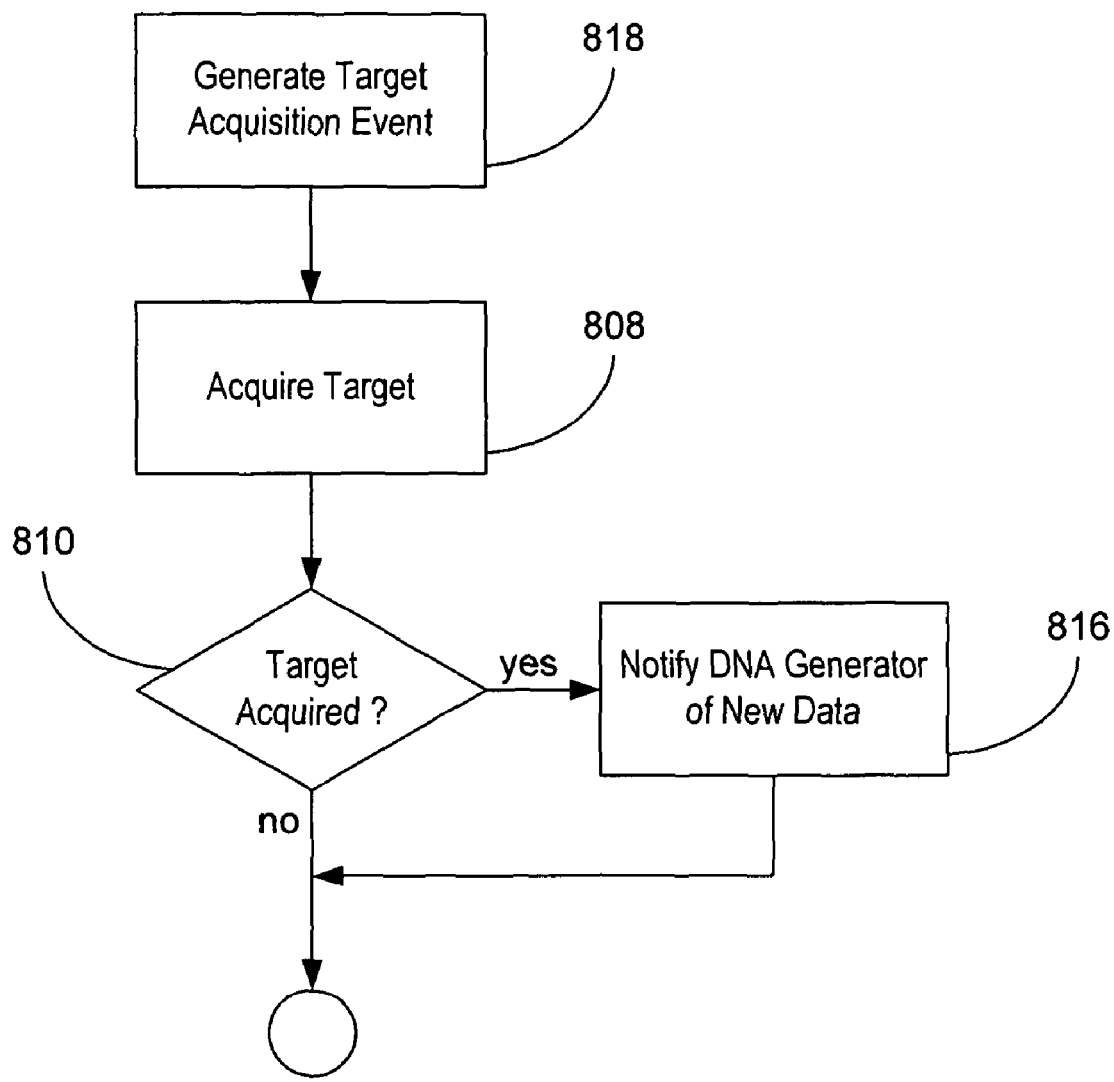
FIG. 8B is a flowchart depicting example steps for asynchronously acquiring network DNA in accordance with an embodiment of the invention.

The procedure depicted in FIG. 8A may be invoked asynchronously or, for example, synchronously in accordance with a schedule. In the case of asynchronous acquisition of one or more raw network DNA components triggered by an event (i.e., a target acquisition event), the target acquisition event may specify one or more raw network DNA components to be acquired. The target acquisition event may even specify the raw network DNA acquisition priority list of step 804 which may enable step 802 and step 804 to be skipped. If the target acquisition event specifies a single raw network DNA component to be asynchronously acquired, step 806, step 812 and step 814 may also be skipped. FIG. 8B depicts example steps that may be performed to asynchronously acquire a single raw network DNA component in accordance with an embodiment of the invention, beginning with step 818 where the target acquisition event is generated and then progressing to a subset of steps similar to those described with reference to FIG. 8A.

Figure 9:
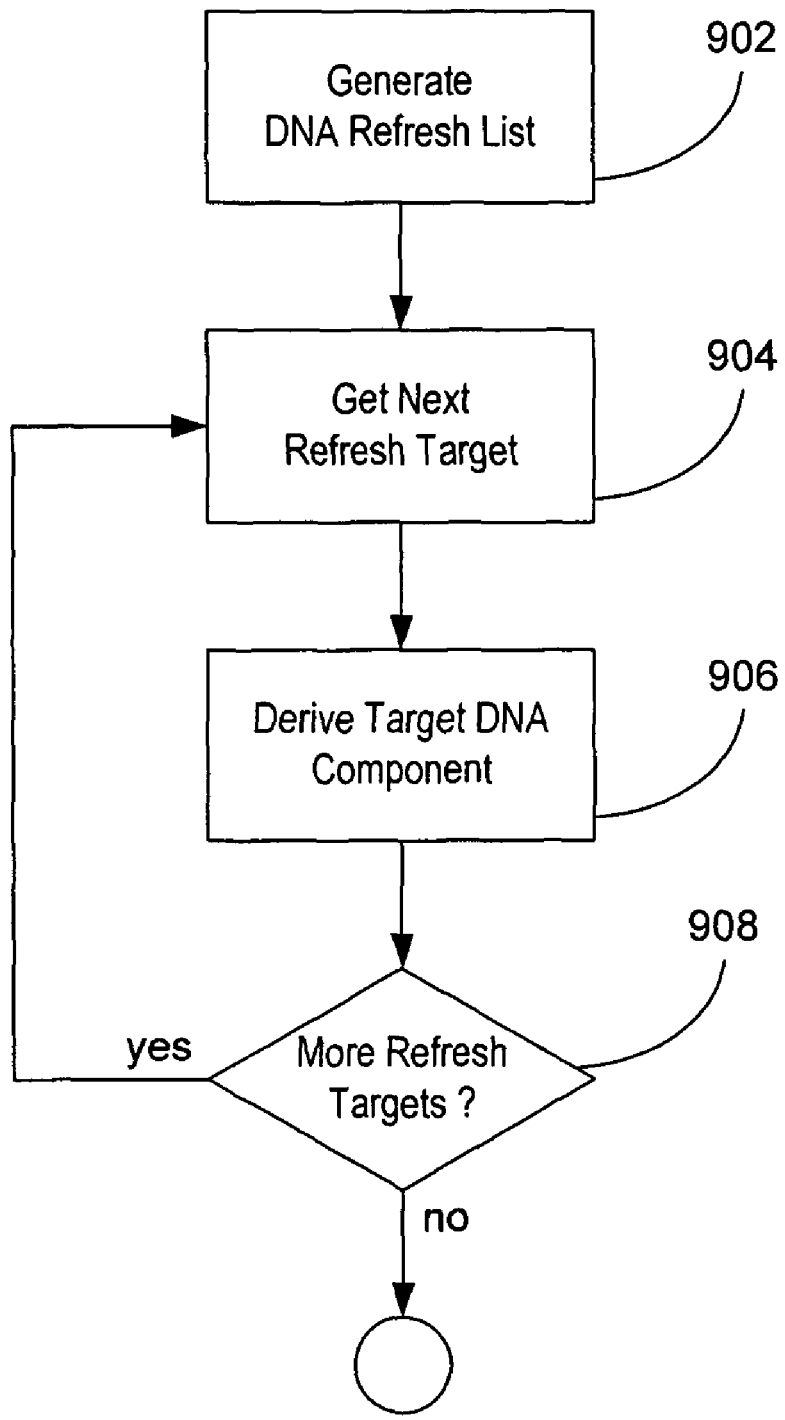
FIG. 9 is a flowchart depicting example steps for generating network DNA in accordance with an embodiment of the invention.

The network DNA generator 404 (FIG. 4) may generate derived network DNA component values asynchronously (e.g., in response to raw network DNA acquisition events) or in accordance with a network DNA generation schedule. FIG. 9 depicts example steps that may be performed to generate network DNA in accordance with an embodiment of the invention. At step 902, a derived network DNA refresh list is generated. For example, the network DNA generator 404 (FIG. 4) may be notified of raw network DNA component updates and may add to the refresh list each derived network DNA component that depends upon a changed raw network DNA component (e.g., updated since a previous derived network DNA refresh). The derived-raw network DNA component dependency lists 418 may specify dependencies between derived and raw network DNA components.

At step 904, a next refresh target (i.e., a particular derived network DNA component) may be selected from the derived network DNA refresh list. At step 906, a value of the selected derived network DNA component may be derived (i.e., determined) in accordance with associated derived network DNA component specifications 416 (FIG. 4). For example, the network DNA generator 404 may retrieve current values of raw network DNA components 420 and transform them as specified by a particular derived network DNA component specification. At step 908, the derived network DNA refresh list is checked for more refresh targets. If there are more refresh targets then the procedure returns to step 904 to select the next target, otherwise, the procedure exits.

Figure 10:
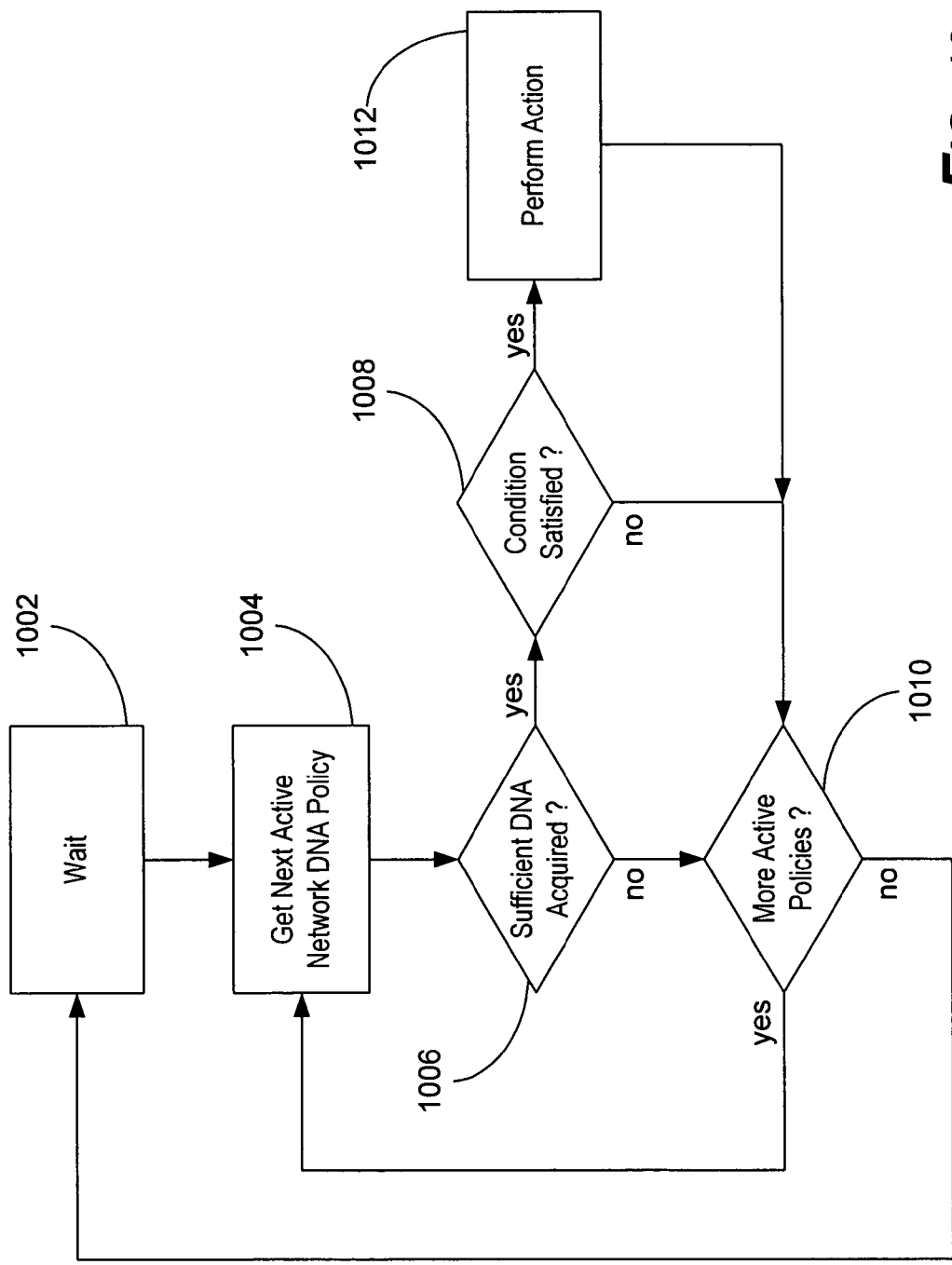
FIG. 10 is a flowchart depicting example steps for enforcing network DNA policies in accordance with an embodiment of the invention.

The network DNA policy enforcer 412 (FIG. 4) may enforce network DNA policies asynchronously (e.g., in response to current network DNA update events) or in accordance with a network DNA policy enforcement schedule. FIG. 10 depicts example steps that may be performed to enforce network DNA policies in accordance with an embodiment of the invention. At step 1002, the procedure resides in a wait state. The procedure may leave the wait state, for example, if a scheduled time period elapses and/or if an interesting (i.e., policy affecting) network DNA module event (e.g., published event) occurs.

At step 1004, a next active network DNA policy is selected, for example, from the network DNA policy store 410 (FIG. 4). The selected network DNA policy 600 (FIG. 6) may be associated with one or more derived network DNA components and/or one or more raw network DNA components, for example, as listed in the derived network DNA components dependency list 610 and the raw network DNA components dependency list 612 of the selected network DNA policy 600. At step 1006, it may be determined whether sufficient network DNA components associated with the selected network DNA policy 600 have been acquired, for example, by the network DNA acquirer 402 and stored in the current network DNA 406 store. For example, sufficient network DNA components may have been acquired if a confidence level (e.g., confidence levels 516, 518, 520, 522, 524, 526 and 528 of FIG. 5) associated with each network DNA component referenced by the selected network DNA policy 600 has a value greater than zero, or at least one confidence level is greater than a sufficient network DNA acquisition threshold (e.g., 50%), or some statistical function (e.g., average) of the confidence levels is greater than the sufficient network DNA acquisition threshold. If sufficient network DNA components have been acquired then the procedure progresses to step 1008, otherwise, the selected network DNA policy 600 is not tested and the procedure progresses to step 1010.

At step 1008, the network DNA policy condition 604 (FIG. 6) of the selected network DNA policy 600 may be tested. For example, if the network DNA policy condition 604 is specified with a structured query language statement then the structured query language statement may be submitted to a structured query language interpreter. If the network DNA policy condition 604 is satisfied (e.g., if an expression specified by the network DNA policy condition 604 evaluates to Boolean true or non-NULL) then the procedure progresses to step 1012, otherwise, the network DNA policy action 606 of the selected network DNA policy is not performed and the procedure progresses to step 1010.

At step 1012, execution of the network DNA policy action 606 of the network DNA policy 600 is initiated. For example, the network DNA policy enforcer 412 may make a procedure call (local or remote), invoke a method of a program object, send a message to a program module or a system user or administrator and/or initiate any suitable programmatic technique for performing an action on a computer (e.g., the computer 102 of FIG. 1). At step 1010, it is determined whether there are more active network DNA policies to test. If there are more active network DNA policies to test this cycle then the procedure returns to step 1004 to select the next active network DNA policy. Otherwise, the procedure returns to step 1002 and waits for the next scheduled or asynchronous wake-up event.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-storage medium encoded with computer-executable instructions that, when executed on a computer connected to a computer network, perform a method for configuring the operation of the computer connected to the computer network, the method comprising:

acquiring at least one network attribute, each network attribute corresponding to an attribute of the computer network;

generating a value for at least one derived network DNA component according to at least one derived network DNA component specification, each derived network DNA component corresponding to an attribute of the computer network, and at least one of said at least one derived network DNA component specification referencing at least one of said at least one network attribute and processing by which the value of the derived network DNA component is generated from the referenced at least one network attribute;

determining a network DNA for the computer network, the network DNA classifying the computer network, and the network DNA comprising at least one of said at least one derived network DNA component indicating a network species classification selected from among a plurality of network species classifications, the network species component indicating the network species is a first species if a first combination of network conditions is identified in the at least one attribute of the computer network;

the network species component indicating the network species is a second species if a second combination of network conditions is identified in the at least one attribute of the computer network; and the network species component indicating the network species is a third species if a third combination of network conditions is identified in the at least one attribute of the computer network;

selecting a network DNA policy action to execute based on the at least one derived network DNA component meeting at least one condition specified in the network DNA policy; and initiating on the computer connected to the computer network an execution of the network DNA policy action of the network DNA policy, the execution of the network DNA policy action configuring network security settings of the computer that control communication over a connection to the computer network when the at least one derived network DNA components meeting at least one condition specified in the network DNA policy, whereby the network security settings are configured based on the determined network species classification.

2. The computer-storage medium of claim 1, wherein the first species comprises an enterprise network, the second species comprises a home network, and the third species comprises a public place network.

3. The computer-storage medium of claim 1, wherein at least one of said at least one derived network DNA component specification comprises a linear transformation of at least one value of at least one of said at least one network attribute.

4. The computer-storage medium of claim 1, wherein said at least one derived network DNA component specification comprises a combination of said at least one network attribute.

5. The computer-storage medium of claim 1, wherein at least one of said at least one derived network DNA component specification comprises a structured query language statement.

6. The computer-storage medium of claim 1, wherein at least one of said at least one derived network DNA component specification comprises an object oriented language statement.

7. The computer-storage medium of claim 1, wherein at least one of said at least one derived network DNA component specification comprises a scripting language statement.

8. The computer-storage medium of claim 1, wherein acquiring at least one network attribute comprises acquiring a plurality of network attributes in an order specified by an acquisition priority list, the plurality of networks attributes specified by the acquisition priority list comprising at least a subset of a domain name, one or more IP addresses, verified presence of network infrastructure elements, parameters received from a network server, a communications media type, a service provider, a nominal available communications bandwidth, a measured available communications bandwidth, logical network location and physical network location.

9. The computer-storage medium of claim 8, wherein the order specified by the acquisition priority list is in accord with an ordered set of network DNA policies that reference the plurality of network attributes.

10. The computer-storage medium of claim 1, wherein generating at least one derived network DNA component comprises generating each derived network DNA component referenced by a derived network DNA refresh list, the derived network DNA refresh list referencing at least one derived network DNA component dependent upon at least one acquired network attribute.

11. The computer-storage medium of claim 1, wherein the network DNA policy reduces a probability of security vulnerability when switching between computer networks.

12. A computer-storage medium encoded with computer-executable instructions that, when executed by a computer connected to a computer network, perform a method, the method comprising:
acquiring a plurality of attributes of the computer network;
generating a network species component according to a derived network DNA component specification, the derived network DNA component specification referencing at least one of said plurality of attributes of the computer network;
determining a network DNA of the computer network, the network DNA comprising the network species component, the network species component indicating a network species classification selected from among a plurality of network species classifications, the plurality of network species classifications including an enterprise network, a home network, and a public place network,
the network species component indicating the network species is enterprise network if a first combination of network conditions is identified in the plurality of attributes of the computer network;
the network species component indicating the network species is home network if a second combination of network conditions is identified in the plurality of attributes of the computer network; and
the network species component indicating the network species is public place network if a third combination of network conditions is identified in the plurality of attributes of the computer network; and
providing the network DNA through an interface on the computer, the provided network DNA including the network species component,
wherein the first combination, the second combination and the third combination are different.

13. The computer-storage medium of claim 12, wherein the network DNA further comprises a network name component, a network cost component, a core access component, a core addressing component, a network security component and a network technology component.

14. The computer-storage medium of claim 13, wherein the network technology component comprises at least one network operational attribute.

15. The computer-storage medium of claim 12, wherein:
acquiring the plurality of attributes of the computer network comprises acquiring a network security attribute of the computer network, a network management attribute of the computer network and a network addressing attribute of the computer network; and
the derived network DNA component specification for the network species component is a function of at least the network security attribute, the network management attribute and the network addressing attribute.

16. The computer-storage medium of claim 12, wherein the method further comprises:
testing a network DNA policy condition of a network DNA policy for satisfaction, the network DNA policy condition referencing at least one network DNA component; and
initiating on the computer connected to the computer network an execution of a network DNA policy action of the network DNA policy, the execution of the network DNA policy action configuring network security settings of the computer for a connection to the computer network when the network DNA policy condition of the network DNA policy is satisfied.

17. A computerized system, comprising:
at least one computer connected to at least one computer network;
and at least one network DNA store configured to store a network DNA for at least one of said at least one computer network, the network DNA taxonomically classifying said at least one of said at least one computer network, and the network DNA comprising at least one derived network DNA component, the at least one derived network DNA component comprising a network species component configured to indicate a network species classification selected from among a plurality of network species classifications, the plurality of network species classifications including an enterprise network, a home network, and a public place network, the network species component indicating the network species is enterprise network if a first combination of attributes of the computer network is detected;
the network species component indicating the network species is home network if a second combination of attributes of the computer network is detected; and
the network species component indicating the network species is public place network if a third combination of attributes of the computer network is detected; and
an interface configured to provide network DNA to at least one application program.

18. The computerized system of claim 17, wherein said at least one network DNA store comprises a current network DNA store and a network DNA history store.

19. The computerized system of claim 17, further comprising a network DNA policy store configured to store at least one network DNA policy, at least one of said at least one network DNA policy referencing at least one of said at least one derived network DNA component of the network DNA.

20. The computerized system of claim 19, wherein each network DNA policy comprises a derived network DNA components dependency list that lists each derived network DNA component of the network DNA referenced by the network DNA policy.

21. The computerized system of claim 17, further comprising a network DNA policy enforcer configured to, at least: test a network DNA policy condition of a network DNA policy for satisfaction, the network DNA policy condition referencing at least one of said at least one derived network DNA component; and initiate an execution of a network DNA policy action of the network DNA policy if the network DNA policy condition of the network DNA policy is satisfied.

22. The computerized system of claim 21, wherein the network DNA policy condition of the network DNA policy is satisfied if an expression specified by the network DNA policy condition evaluates to Boolean true.

23. The computerized system of claim 21, wherein the network DNA policy condition of the network DNA policy is satisfied if an expression specified by the network DNA policy condition evaluates to Boolean false.

24. The computerized system of claim 21, wherein the network DNA policy condition of the network DNA policy is satisfied if evaluating an expression specified by the network DNA policy condition results in an evaluation error.

25. The computerized system of claim 21, wherein the network DNA policy enforcer is further configured to, at least, test whether sufficient network DNA referenced by the network DNA policy condition of the network DNA policy has been acquired.

26. The computerized system of claim 25, wherein: each network DNA component is associated with a confidence level; and sufficient network DNA has been acquired for the network DNA policy if the confidence level of each network DNA component referenced by the network DNA policy condition of the network DNA policy is greater than zero.

27. The computerized system of claim 25, wherein: each network DNA component is associated with a confidence level; and sufficient network DNA has been acquired for the network DNA policy if the confidence level of at least one network DNA component referenced by the network DNA policy condition of the network DNA policy is greater than a sufficient network DNA acquisition threshold.

28. The computerized system of claim 25, wherein: each network DNA component is associated with a confidence level; and sufficient network DNA has been acquired for the network DNA policy if a statistical function of the confidence levels of each network DNA component referenced by the network DNA policy condition of the network DNA policy is greater than a sufficient network DNA acquisition threshold.

29. The computerized system of claim 17, further comprising a network DNA generator configured to, at least generate said at least one derived network DNA component according to at least one derived network DNA component specification, at least one of said at least one derived network DNA component specification referencing at least one raw network DNA component of the network DNA associated with the computer network.

30. The computerized system of claim 29, wherein the network DNA generator is further, at least, configured to maintain at least one derived-raw network DNA component dependency list, said at least one derived-raw network DNA component dependency list comprising, for each derived network DNA component generated by the network DNA generator, a list referencing each raw network DNA component referenced by each derived network DNA component specification associated with the derived network DNA component.

31. The computerized system of claim 29, wherein the network DNA generator is further, at least, configured to generate each derived network DNA component referenced by a derived network DNA refresh list, the derived network DNA refresh list referencing each derived network DNA component dependent upon a changed raw network DNA component.

32. The computerized system of claim 17, further comprising a network DNA acquirer configured to, at least, acquire a plurality of raw network DNA components in an order specified by a raw network DNA acquisition priority list, each raw network DNA component corresponding to an attribute of said at least one computer network.

33. The computerized system of claim 32, wherein the order specified by the raw network DNA acquisition priority list is in accord with an ordered set of network DNA policies that reference the plurality of raw network DNA components.

34. The computer-storage medium of claim 1, wherein:
the value of each derived network DNA component has a confidence level associated therewith; and
the network DNA policy condition is satisfied when the referenced derived network DNA component has a value specified in the network DNA policy and the confidence level for the value of the referenced derived network components is above a threshold.

35. The computer-storage medium of claim 12, wherein determining the network DNA comprises:
determining the network species is enterprise network if the first combination of network conditions is met, the first combination of network conditions being met if a plurality of:
(a) the computer network is a secure network and is a managed network,
(b) the computer network is a private network, and
(c) the computer network provides connectivity to one or more specified enterprise resources;
determining the network species is home network if the second combination of network conditions is met, the second network condition being met if a plurality of:
(a) the computer network is an insecure network and an unmanaged network,
(b) the computer network provides ad hoc and/or limited connectivity between network nodes and other computer networks,
(c) the computer network is a private network, and
(d) the computer network is a premise network or a proximity network; and determining the network species is public place network if the third combination of network conditions is met, the third network condition being met if a plurality of:
(a) the computer network is an insecure network and an unmanaged network,
(b) the computer network has an associated access cost, and
(c) the computer network is not a private network, is not a premise network and is not a proximity network.

36. The computerized system of claim 17, wherein:
determining the network species is enterprise network if the first combination of attributes of the computer network is detected, the first combination of attributes of the computer network is detected if a plurality of:
(a) the computer network is a secure network and is a managed network,
(b) the computer network is a private network, and
(c) the computer network provides connectivity to one or more specified enterprise resources;
determining the network species is home network if the second combination of attributes of the computer network is detected, the second combination of attributes of the computer network is detected if a plurality of:
(a) the computer network is an insecure network and an unmanaged network,
(b) the computer network provides ad hoc and/or limited connectivity between network nodes and other computer networks,
(c) the computer network is a private network, and
(d) the computer network is a premise network or a proximity network; and
determining the network species is public place network if the third combination of attributes of the computer network is detected, the third combination of attributes of the computer network is detected if a plurality of:
(a) the computer network is an insecure network and an unmanaged network,
(b) the computer network has an associated access cost, and
(c) the computer network is not a private network, is not a premise network and is not a proximity network.

* * * * *